United States Patent [19]

Sunden et al.

[11] 3,969,295

[45] July 13, 1976

[54] AQUEOUS LATEX MATERIAL TO BE USED FOR PRODUCTION OF REINFORCED PLASTICS AND BINDERS AND METHOD FOR PRODUCING THE SAME

[75] Inventors: Olof Sundén, Lidingo; Hans Erik Johansson, Kungalv, both of Sweden

[73] Assignee: Elektrokemiska Aktiebolaget, Surte, Sweden

[22] Filed: Dec. 6, 1974

[21] Appl. No.: 530,504

[30] Foreign Application Priority Data

Dec. 21, 1973 Sweden .............................. 7317389

[52] U.S. Cl. .................. 260/29.6 S; 106/308 M; 260/29.6 MM; 260/42.55
[51] Int. Cl.² .............................................. C08L 23/08
[58] Field of Search .............. 260/29.6 MM, 29.6 S, 260/42.55; 106/308 M

[56] References Cited
UNITED STATES PATENTS

| | | | |
|---|---|---|---|
| 2,467,339 | 4/1949 | Seymour | 260/42.55 |
| 2,560,043 | 7/1951 | Schmidt | 260/42.55 |
| 2,616,860 | 11/1952 | Leukhardt, Jr. et al. | 260/41.5 MP |
| 2,885,366 | 5/1959 | Iler | 252/315 |
| 2,964,490 | 12/1960 | Howland et al. | 260/41.5 MP |
| 3,190,851 | 6/1965 | Maass et al. | 260/42.55 |
| 3,392,140 | 7/1968 | Maahs et al. | 260/42.55 |
| 3,692,734 | 9/1972 | Klotzer et al. | 260/42.55 |
| 3,817,911 | 6/1974 | Taylor | 260/39 R |

FOREIGN PATENTS OR APPLICATIONS 1,144,767 3/1969 United Kingdom

*Primary Examiner*—M. J. Welsh
*Attorney, Agent, or Firm*—Young & Thompson

[57] ABSTRACT

An aqueous latex material to be used for production of reinforced plastics and binders comprising latex particles of a film-forming organic polymer encapsulated with a layer of acidic, hydrated and hydrogen bound silicic acid in monomeric or oligomeric form.

8 Claims, No Drawings

AQUEOUS LATEX MATERIAL TO BE USED FOR PRODUCTION OF REINFORCED PLASTICS AND BINDERS AND METHOD FOR PRODUCING THE SAME

The present invention relates to latices of organic polymers having new and specific film-forming and coagulation properties, which have been found useful as binders for non-woven textiles, paints and other products.

In order to improve the properties of non-woven textiles, one has tried to concentrate the latex binder at the crossing points of the fibers, where binding is required, without covering the fiber surfaces with latex as well as without forming plastic films between fibers which results in inferior non-woven properties. These efforts have not been successful, and the task has never been achieved only be modification of the latex. However, this has been successfully performed by means of the present invention.

Within the paper industry, many efforts have been made to combine paper or cellulose fibers with latices of thermoplastic polymers. The aim has been new and improved materials having the charateristics of leather and textile. These efforts have not been successful either, due to low retention between cellulose and latex particles and due to strong adhesion of tacky thermoplastic depositions on machinery and equipment. By means of the present invention, these difficulties have been overcome.

In recent years, there has been a trend towards replacing solvent based paints with water based latices. Organic solvents have increased in price and have been considered more and more dangerous with respect to health. However, one serious drawback of latex paints is their high tendency of soiling and their resistance to washing and cleaning. Due to the unique film-forming properties achieved by the present invention, this drawback has also been eliminated.

According to the invention, we have found that latices treated with monomeric and/or oligomeric silicic acid in aqueous acidic solution under conditions specified below will function as binders with the advantageous results indicated below.

Thus the present invention provides an aqueous latex material to be used for production of reinforced plastics and binders comprising latex particles of a film-forming organic polymer encapsulated with a layer of acidic, hydrated and hydrogen-bound silicic acid in monomeric and/or oligomeric form, which layer is not penetrated by the organic polymer under wet conditions but penetrated upon drying under formation of a plastic structure, said structure being highly reinforced by a continuous but submicroscopically fine silicic acid structure, said latex having the property of delayed film-forming during drying.

According to a preferred embodiment of the invention the latex material has between 0.5 and 50%, preferably between 2 and 15%, silicic acid encapsulated around the latex particles, calculated as $SiO_2$ on the weight of the organic polymer.

The present invention also provides a process for producing a latex material comprising the steps of a. the addition of an aqueous solution of monomeric and/or oligomeric silicic acid to a latex of a film-forming organic polymer, the particle surfaces of which are capable of forming hydrogen bonds to acidic silicic acid while maintaining a pH below 6, preferably between 1.5 and 4.5 for deposition of the silicic acid as an encapsulation on the surface of the organic polymer particles and a reversible agglomeration of the encapsulated particles, b. the addition of alkali to the encapsulated and agglomerated latex up to a pH of 8 to 12, preferably 9 to 11, in the water phase for inducing a negative ionic charge on the outer surface of the acidic silicic acid encapsulation layer and thereby causing reemulsification to a storage stable and easily-transportable latex.

According to a preferred embodiment of the invention said process also comprises the steps of filtration, washing and concentration of the agglomerated and encapsulated latex product before said reemulsification. The aqueous solution of monomeric and/or oligomeric silicic acid for use in the process is preferably of the type obtained by rapid neutralization and acidification of an alkali silicate solution to a final pH below 4, preferably between pH 1.5 and pH 3.0, said silicate solution being added to a strong acid such as hydrochloric acid or sulphuric acid or to a suspension of a strong, acidified cation exchanger.

It is well known that polymer latices such as rubber latices can be mixed with fine silica particles in the form of emulsions or powders in order to provide improved properties of the vulcanized products (white carbon black). For the purpose of this invention, no types of silica have been found useful. Silica is solid particles of highly polycondensated silicic acid or, expressed in another way, solid, somewhat hydrated silicon dioxide. The only product useful according to the invention is monomeric and/or oligomeric silicic acids in aqueous acidic solution.

According to U.S. Pat. No. 2,885,366 it is known, that inorganic powders as well as latices of organic polymers can be treated and the particles encapsulated by a skin of silica, if silica is slowly precipitated from an alkalisilicate solution at pH 8-11 and at a temperature of 80°-100°C, provided the surface of the particles is covered in advance with metallic ions receptive to silica. It must be emphasized that all these conditions directly contradict those which must be used according to the present invention in order to achieve the desired latex properties. Furthermore, the U.S. Pat. No. 2,885,366 does not reveal anything about the properties of such encapsulated latices or their technical usefulness. Erroneously, the patent talks about "monosilicic acid" at a pH of about 10, and it is obvious that "silicic acids" at pH 10 are chemically and physically distinct from "acidic momeneric and/or oligomeric silicic acids at pH 1-6" according to this invention. According to investigations published in 1970 (E.G. Acker, Journal of Colloid and Interface Science, vol 32 No 1) even the gels and silicas formed from acidic silicic acid are quite distinct from gels and silicas formed from alkaline silicates, both with respect to chemical composition and physical properties.

The latex according to the present invention is characterized by delayed film-forming properties during drying due to the fact that the latex particles concentrate in the final water meniscus left at fiber crossing points or pigment contact points at the end of the drying process. At these crossing and contact points, the latex particles will form adhesive agglomerates of plastic reinforced by silicic acid at the final drying. Further, the latex is characterized by the structure of its particles, which are encapsulated by monomeric and/or oligomeric silicic acid at a PH below 6, preferably between 1.5 and 4.5. The encapsulation temperature should be low, preferably between 5° and 25°C. Presence of polyvalent metallic ions should be avoided, because they do not function as coupling agents in acidic solutions, and because they will interfere in a less advantageous way later in the latex preparation process. Finally the latex is characterized by the way in which the silicic acid is bound to the polymer. It is not bound by any bridges of polyvalent metal ions like aluminium. It is bound be hydrogen bonding, which power is very pronounced for silicic acids at low pH but absent on the alkaline side.

Most latices used for binding non-woven textiles and paints have polymer groups, suitable for hydrogen bonding to silicic acids like acrylate groups and vinylacetate groups. These groups are not very strong hydrogen binders in diluted aqueous systems, however, which is why a coupling substance may be valuable, which can concentrate the silicic acid as a less soluble surface active complex at the surface of the latex particles. Suitable complex formers of this type are surface active agents of polyethylene oxide bound to a hydrocarbon radical. Even polyvinylalcohol functions satisfactorily as coupling agent. Later in the preparation process, this coupling agent is more or less released and the silicic acid is bound to the polymer. During the drying, water which has been hydrogen bonded to the silicic acid is released too and the bonding power changed over to the polymer while the structures penetrate each other during formation of a polymer-silicic acid composite. This composite is characterized by a unique structure having a continuous matrix of hard and stiff silicic acid-polymer phase in which softer particles of residual polymer without silicic acid are dispersed. Consequently this structure is the reverse of the regular structure achieved when silica or other powder products are mixed into a plastic matrix. The matrix is then soft while the dispersed phase is hard. This difference of structure has been confirmed by electron microscope investigations.

In more details, the process according to the invention can be described in different steps as follows:

A. A freshly prepared aqueous solution of monomeric and/or oligomeric silicic acid is added to a polymer latex with particle surfaces capable of forming hydrogen bonds, causing the silicic acid to deposit on the surface of the latex particles. This step of the process must be performed at pH below 6, preferably between 1.5 and 4.5. The speed and degree of surface deposition may be improved by coupling surface active agents such as ethylene oxide adducts, concentrating the silicic acid as less soluble intermediates at the surface of the latex particles.

B. The accordingly encapsulated latex can be agglomerated without irreversible coagulation. The agglomeration tendency is most pronounced at pH between 4 and 6. If required, the latex at this step can be filtered, centrifuged and washed free of salts and other water-soluble contaminations originating from the polymerization of the latex and from the silicic acid solution. If the latex does not contain any harmful contaminations from the polymerization process and if the silicic acid is free of salt contaminations, this filtration and washing step is not required.

C. The accordingly encapsulated and agglomerated latex is reemulgated to a stable latex by addition of alkali to a pH of 8–12, preferably 9–11, provided that the silicic acid is deposited on the particle surface and the water phase does not contain substantial amounts of dissolved silicic acid or polyvalent metal ions. Any residual silicic acid left in the water solution will otherwise be transferred to silica gel not bound to the polymer particles, and presence of polyvalent metal ions will make agglomeration irreversible, hindering the reemulgation.

D. The accordingly encapsulated, agglomerated and reemulgated latex shows, during drying, a delayed film formation, causing the latex particles to collect in the water meniscus of contact points between fibers and pigments. Further, it forms a polymer-silicic acid structure of a hard continuous matrix with dispersed soft particles of pure polymer, during the final drying. It is a further characterization of the latex according to this invention that, upon drying, it provides such a "reversed" structure with a continuous hard matrix including soft dispersed particles. The drying can be performed at any temperature (50°–130°C) but strength and hardness will be improved if pH is decreased to 2–4 during the drying operation. As long as the latex is wet, the organic polymer does not penetrate the silicic acid encapsulation, but at the end of the drying process the organic polymer replaces water in the hydrogen bonded silicic acid-water structure.

Silicic acid in monomeric and oligomeric form is still incompletely known, mainly due to its rapid polycondensation to sols and insoluble gels. The technical way to produce it is to neutralize and acidify and alkalisilicate solution rapidly down to a low pH, preferably below 2, where the corresponding silicic acid is liberted and its further polycondensation to higher oligomers and polymeric sols and gels is delayed. Due to the very severe requirement of rapid acidification between pH 11 and pH 5, the alkali silicate solution must be added to a strong acid in very fine streams during rapid agitation, and the silicate solution must not be too viscous. Metasilicate solutions and solutions of waterglass with ratios $SiO_2:Na_2O$ from 1.5 to 4.0 can be used, but diluted in order to avoid excessive viscosity. Practical concentrations of waterglass solutions are in the range of up to 200 g/l $SiO_2$, when waterglass of ratio 3.3 is concerned. Nor can the concentration of the acid be very high, because soluble silicic acids are easily salted out. When hydrochloric or sulfuric acid is used, practical concentrations are in the range of 4–6 N. Instead of using strong acids directly, one can also use cationic ion exchangers in the acidified state, in which case the alkali ion will be absorbed by the ion exchanger, leaving a soluble silicic acid having no or limited salt contaminations. Another way to avoid salt contaminations, is to use sulphuric acid and then to remove sodium sulphate by crystallisation at −3° to 0°C. In this way silicic acid solutions with concentrations of 100–180 g/l $SiO_2$ can be achieved, which are stable for some hours provided the pH is below 2 or 3. Due to polycondensation of the watersoluble monomeric and oligomeric silicic acids, light-scattering sols and finally solid gels are formed. The silicic acid solution should be added to the latex before any light scattering sol is developed. The silicic acid can finally also be produced in situ in the latex itself, if this is acidified to pH preferably below 3 and by adding alkalisilicate solution carefully while maintaining a low pH.

There are some requirements of the latex material used for modification according to the invention. The first requirement is that the polymer should be filmforming at temperatures used for drying the end product. This means that the polymer should have a minimum degree of softness and plasticity at the drying temperature so that it can penetrate the extremely fine capillaries developed in the encapsulating silicic acid structure when hydrogen bond water evaporates therefrom. According to calculations, capillary pressures of 10,000 atmospheres may develop during the drying process forcing the polymer into the silicic acid structure, penetrating it and finally adhering to neighbouring particles. If the polymer is too rigid either of these forces can force it to penetrate the encapsulation. The silicic acid is then transferred to a skin of silica, which breaks up under the drying pressure and peels off.

Another requirement of the latex polymer is that it should contain some groups having hydrogen bonding power such as acrylate groups or vinyl acetate groups. A prepared surface of the latex particles may be helpful in, for instance, carboxylation of butadiene latices and adding surface active ethyleneoxide products to the latex. As the encapsulation process must be performed on the acidic side, a third requirement is that the emulgator system can stand against acidic conditions at pH 2–4. This is best achieved by surface active products such as said polyethylene oxide surfactants and polyvinylalcohols. The encapsulation by silicic acid of the latex particles is accompanied by a considerable increase of their volume due to the fact that the silicic acid is deposited as a water rich hydrogen-bound agglomerate. The encapsulation is therefore accompanied by an increased viscosity of the latex. The latex treated should not be too concentrated. Concentrations of 15–40% are practically applicable after addition of the silicic acid solution. The higher concentration requires a salt-free silicic acid solution, because salts contribute to agglomeration and further increased viscosity.

The amount of silicic acid required to give the latex the desired properties can vary between 2 and 15% depending on polymer softness and emulsification system. For special purposes, even lower and higher concentrations from 0.5 to about 50% calculated as $SiO_2$ based on the dry weight of the organic polymer can be used.

When more than 2 or 3% monomeric or oligomeric silicic acid is deposited on the surface of the latex particles, these change character and behave more like a suspension of clay or kaoline than an emulsion of an organic polymer. It appears that 2 to 3% of silicic acid should be required to give an inpenetrable encapsulation in the wet stage. This amount is of course dependent on the particle size of the latex. Particles with a diameter of $10^{-4}$ mm need more silicic acid than particles with a diameter of $10^{-2}$ mm, which are the practical limits of polymer latices.

The addition of monomeric and/or oligomeric silicic acid to the original polymer latex should be done slowly and under suitable agitation as it is very important that the latex does not form coagulated precipitates and that the silicic acids do not form precipitated silica gels. The silicic acid must have sufficient time to have an opportunity to deposit on the surface of the particles. The speed of deposition is increased by intermediate hydrogen bonding surfactants such as the polyethylene oxide adducts. It can take up to 24 and even 48 hours to deposit higher amounts of silicic acids or 8–20%. The speed of deposition can also be increased by increased pH to between 4 and 6 and by higher temperature or 40°–50°C, but these measure are somewhat dangerous as they also contribute to the formation of inactive and harmful silica gels beside the desired silicic acid encapsulated polymer particles. As long as the latex contains substantial amounts of soluble silicic acid an increase of pH and temperature should therefore be avoided. When addition of silicic acid starts, the latex should not have higher pH than 6, and when the silicic acid concentration of the latex is increased to 3–12 % of the polymer corresponding to approx. 1.5–6% by weight of water, the pH should be kept below 4 during the deposition reaction, in order to get the best results. The silicic acid solution may have a concentration of from 150 or even 180 g/l $SiO_2$ down to a few g/l and the pH should not be above 3, at least not for the higher concentrations mentioned, otherwise silica gels are easily formed. The silicic acid solution may contain the salts formed during its acidification or these salts may be removed before addition to the latex. If salts are present, agglomeration, filtration and washing according to the next step is required.

After encapsulation is finished the latex is mostly agglomerated. In case washing or concentration is required, the latex material can be filtered off or centrifuged and finally washed with water. A solid filter cake is then formed which is not tacky in the wet state, but more like a cake of clay or natural starch. The cake can be suspended in water at prevailing pH of 4–8 after washing, but it cannot be really emulsified at this pH.

For real reemulsification of the agglomerate, a pH of 8–12, and preferably between 9–11 is required. This is easily achieved by adding sodium hydroxide in a 1 to 5 N solution to the semisolid agglomerated latex or the filter cake under intensive kneading by help of a monopump or similar equipment. It is very important that the strong alkali does not concentrate on some spots, as it may then dissolve the silicic encapsulation, forming soluble silicic acids that finally form silica gels when the pH is equalized to the desired level of 9 or 10. Further, the increase of pH up to 9 should be done as quickly as possible because agglomeration is intensified in the pH range of 6–8 and then more difficult to brake. The best way to reemulgate is therefore to calculate the required amount of alkali and add it according to a program depending on the pumping action of the mixing equipment. Just after final addition of alkali, the pH may be 10–11. The agglomerates then separate under formation of an emulsion, while the pH slowly decreases about one unit to 9–10. During this process also possible coupling agents such as ethylene oxide adducts are partly released, while the silicic acid remains as an encapsulation skin. Calculations show that the amount of alkali required for emulsification corresponds to about 1 mol $Na_2O$ per 10 mol $SiO_2$ or, broadly, to 6–20 mol SiO of silicic acid present in the encapsulation skin. Such emulsions are stable for a year in concentrations of 30–45%. Higher concentrations are difficult to achieve, due to the high viscosity.

Such latices can be applied direct as binders for non-woven textiles and for paints. For use in non-woven material it is important that the latex be applied in a relatively diluted state of 2–10% solid content because the encapsulated latex particles have a relatively high water demand to find their way to the fiber crossing points. If concentrated and viscous latices are applied, the latex particles cannot move along the fibers. The latex particles, consequently, have to stay where applied, which does not give an optimal result. For non-woven materials it is further of advantage to acidify the latex in the diluted form just before its application to the web. There are two reasons for this. Again the composite formed between silicic acid and the organic polymer during drying gets stronger and harder at a pH of 2–4 than a pH of 8–9. Further, the cross-linking reaction of the organic polymer, often required for non-woven material, must be performed at low pH.

In optimal cases, 15.0% increase of strength has been achieved in non-woven material with the same amount of binder when silicic acid encapsulated latices were used. If an unchanged strength is required, the applied amount of latex binder can be reduced to 40 or even 30% compared with the same latex, not encapsulated. Another surprising fact is that the stiffness of the final non-woven product is not influenced very much in relation to the high increase of strength. This can be explained by the fact that the fibers are much less covered by plastic films and that no plastic films are formed between the fibers.

Similar advantages are achieved if encapsulated latex is used for binding special papers intended for leather substitutes, packings etc. An advantage in this case is that very high retentions can be achieved in cellulose with help of Al-sulphate as a coupling agent between cellulose and the silicic acid skin.

When used as a binder for paints and pigments, silicic acid encapsulated latices give a new structure of painted surfaces. This structure is much more soil resistant than paint surfaces from ordinary latices. It is easier to clean and wash. Further, it is less penetrable by water but more penetrable by vapor than paints of ordinary latices.

EXAMPLE 1

In order to study the properties of the plastic-silicic acid composition under varying pH conditions of encapsulation and drying the following experiments were carried out with a vinylacetate ethylene copolymer.

To the copolymer (Vinnapas EV-2 a vinylacetate copolymer of Firma Wacker Chemie in the form of a 50% emulsion was added a freshly prepared 12% monomeric-oligomeric silicic acid corresponding to a proportion of 10% $SiO_2$ based on dry polymer. The encapsulation was carried out through addition of 3% KF ions based on silic acid volume, and pH was maintained at 2.5 for 12 hours. The specimen was thereafter dried in part at pH 2.5 and in part at pH 9.5 (after adjustment with NaOH). In another experiment water glass was added to the same emulsion corresponding to 10% $SiO_2$, after which the pH was adjusted to 9.5. This specimen was also dried at pH 9.5 and 2.5, respectively (after adjustment with hydrochloric acid). After drying, the specimens were pressed into plates.

The hardness of the obtained specimens was measured.

The same series of experiments was carried out on an acrylic polymer, Acronal 290 D, an acrylic polymer of BASF.

| Polymer | pH encapsulation | pH drying | Hardness Shore A at 32°C |
|---|---|---|---|
| Vinnapas | 2.5 | 2.5 | 72 |
| Vinnapas | 2.5 | 9.5 | 52 |
| Vinnapas | 9.5 | 9.5 | 34 |
| Vinnapas | 9.5 | 2.5 | 58 |
| Acronal | 2.5 | 2.5 | 95 |
| Acronal | 2.5 | 9.5 | 87 |
| Acronal | 9.5 | 9.5 | 75 |

-continued

| Polymer | pH encapsulation | pH drying | Hardness Shore A at 32°C |
|---|---|---|---|
| Acronal | 9.5 | 2.5 | 82 |

Electron microscope photos of the dried material show that it consists of islands of pure plastic of an order of magnitude of 1 $\mu$m (the same as the EVA ethylene vinyl acetate (EVA) particles in the emulsion) surrounded by a continuous structure of plastic and silicic acid in a homogeneous composite. Particles of pure silicic acid cannot, on the other hand, be discerned.

The specimen plates are also completely transparent for $SiO_2$ proportions of up to 15% and show a sharp increase of stiffness and notably improved resistance to wear compared to non-encapsulated dried EVA polymer.

EXAMPLE 2

To 100 ml 4 N HCl is added with intensive stirring a mixture of 105 ml silicate of sodium ($SiO_2$ = 27.5%; $SiO_2$:$Na_2O$ = 3.3), 135 ml water and 4 ml formalin. When all of the silicate after about 30 minutes has been added, the formed oligomeric silicic acid (I) has a pH between 1 and 2 and a $SiO_2$ proportion of 10% by weight.

500 g of 47% acrylic latex (Primal HA-8an acrylic latex of Rohm & Haas) is diluted with water to 1 liter. Thereafter 94 g of the freshly prepared silicic acid (I) is added dropwise with intensive stirring under 1 h.

The latex now contains 4% $SiO_2$ based on the dry plastic and has a dry content of 22%. The pH is adjusted to 3.5 with NaOH and the latex is allowed to stand overnight for the encapsulation process to be slowly completed. The pH is thereafter raised to 5.0 with NaOH, whereby an agglomeration of the latex begins to occur. This agglomeration can be hastened by heating to 60°C. When the agglomeration process is finished after 2 h, the specimen is filtered and washed, whereby a foaming filtrate completely free from emulsifiers is obtained.

The filter cake is drawn off to a dry content of around 40% and 4 N NaOH is added with processing to pH 9.5. After 30 min the agglomerate is completely dissolved and storable latex (II) at pH 9.5 is obtained with 38% dry content containing 4% $SiO_2$ (based on dry plastic).

A non-woven fabric (III) having a surface weight of about 60g/m² was carded from pure rayon fiber (40 mm; 2 den). 500 ml of the encapsulated latex (III) was diluted to 4 l, i.e. to a dry content of about 5%, and transferred to a saturation bath through which the non-woven fabric was allowed to run. After this saturation the non-woven fabric ran between two cushioned rubber rolls and was then dried at 130°C in a drying press (specimen A).

The saturation bath was then acidified with phosphoric acid to pH 3.0, after which another non-woven fabric was saturated (specimen B). The same latex as above but with 8% $SiO_2$ was tested in alkaline (specimen C) and acidic state (specimen D). For comparison, saturation was also performed with 5% untreated Primal HA-8 (specimen E). The various specimens are compared in the table below. In addition to the properties shown in the table it can be pointed out that the wet strength is improved after application at low pH in specimens B and D compared with the other specimens.

| Specimen series | SiO₂ % | pH in the bath | Tensile strength[r] for 15% binder kg/1.5 cm | % reduction[rr] of binder quantity with retained strength, 1.5 kg/1.5 cm, rel. specimen E | Flexural length as per SIS 650043 cm |
|---|---|---|---|---|---|
| A | 4 | 9 | 1.90 | 50 | 11.0 |
| B | 4 | 3 | 3.0 | 70 | 10.7 |
| C | 8 | 9 | 2.60 | 65 | 11.2 |
| D | 8 | 3 | 3.0 | 70 | 12.0 |
| E | 0 | 3 | 1.25 | — | 11.7 |

[r]All tests in Example 2 and 3 are carried out in the machine direction.
[rr]Several tests have been made with varying binder quantities, whereby a curve has been drawn showing tensile strength vs. binder content. From this the binder content can be read for a given desired strength.

EXAMPLE 3

1 kg acrylic latex (Primal HA-8) is diluted to 2 l with water. Thereafter simultaneously from two different lines dilute water glass and dilute phosphoric acid are added dropwise in such proportions that the pH varies between 2.0 and 3.0. The water glass is diluted with 4 parts water and contains 0.077 g $SiO_2$/ml. 430 ml water glass in all was added resulting in a $SiO_2$ content of 7.0% based on the dry plastic and a dry content of about 20%. Filtering and re-emulsifying with lye are carried out as in Example 2. The prepared latex (IV) has a dry content of 37%, pH 9.5 and 7% $SiO_2$. An unbound non-woven fabric (V) having a surface weight of 61 g/m² (60% rayon 8 mm + 40% sulphate pulp) was sprayed with the latex (IV) after dilution to 5% dry content.

The specimen was carried on a wire cloth through the spray zone to a drying zone where the specimen was dried for 2 min at 130°–135°C. Thereafter the other side was sprayed and dried in the same way (specimen A). In another experiment the non-woven fabric (V) was sprayed first with a buffer solution (citric acid phosphate) of pH 3.0 in such quantity that the pH remained acidic when the latex (IV) was later sprayed on (specimen B). Untreated Primal HA-8 was also sprayed at 5% dry content on the non-woven fabric (V) (specimen C). The results are given in the table below.

kept sufficiently low and the mixing intensity has to be restricted considering the stability of the latex at low pH values. The figures given above represent optimal figures at successful production in situ. The very best and most easily reproduceable figures are obtained when a salt-free solution of a just prepared non-woven monomeric-oligomeric silicic acid is added to the latex. A solution of that kind can be obtained with the use of a strong cationic ion exchanger or by crystallization of sodium sulphate in the case sulphuric acid has been used as acid in the silicic acid production.

EXAMPLE 4

16.0 g paper pulp with a dry content of 92%, whereof two-thirds is unbleached ground pulp and one-third is bleached pine sulphate pulp approximately corresponding to the composition of journal pulp is suspended in 2 l $H_2O$ and is allowed to stand 18 h. Thereafter the pulp is beaten in a lab apparatus for 18 s. To the pulp suspension thus obtained 18.3 g of $SiO_2$- encapsulated EVA emulsion of the same type as in Example 1 containing 8% $SiO_2$ and having a dry content of 40% is added under stirring.

Further, a solution of $Al_2(SO_4)_3 \cdot 18H_2O$ is added corresponding to 0.26 g calculated as $Al_2(SO_4)_3$. After 2 min sheets are formed in the normal way in a sheet form. Retention and physical data are shown in Table 4.

For comparison is shown a specimen having only 3% $SiO_2$ based on the dry polymer, a specimen with pure

| Specimen series | SiO₂ % | pH after spraying | Binder % | Tensile strength kg/2.5 cm | % reduction[r] of binder amount w. retained strength, 1.7 kg/2.5 cm rel. specimen C | Elastic bending modulus[rr] dyn. cm²/cm | friction portion dyn. cm/cm | Flexural length cm |
|---|---|---|---|---|---|---|---|---|
| A | 7 | 9 | 18 | 2.38 | 50 | 271 | 16 | 18.4 |
| B | 7 | 3 | 13 | 1.65 | 37 | 254 | 113 | 15.4 |
| C | 0 | 3 | 20 | 1.65 | — | 260 | 154 | 15.4 |

[r]See note, Example 2.
[rr]Shirley Bending Tester according to method from Journal of Textile Institute 1964, T516.

The production of monomeric-oligomeric silicic acid in situ in the latex is hazardous as silica or silica gel is easily obtained because of the fact that pH cannot be EVA and a specimen without polymer addition.

| Added latex product % of pulp | SiO₂ in % of EVA | Retention % | Dry strength kg/1.5 cm | Wet strength % of dry | Water absorption mm/2 min |
|---|---|---|---|---|---|
| 50 | 8 | 96 | 3.1 | 13 | 12 |
| 50 | 3 | 86 | 3.4 | 11 | 12 |
| 50 | 0 | 59 | 3.8 | 13 | 6 |

-continued

| Added latex product % of pulp | SiO₂ in % of EVA | Retention % | Dry strength kg/1.5 cm | Wet strength % of dry | Water absorption mm/2 min |
|---|---|---|---|---|---|
| 0 | — | — | 2.0 | <5 | 14 |

EXAMPLE 5

1 kg Acronal 290 D (50%) was diluted with 1 liter water and the pH adjusted to 2.5 with dilute acetic acid. Encapsulation takes place in accordance with one of the methods in Examples 1–3 so that a SiO₂ content of 5% is obtained based on dry plastic. Agglomeration, filtering and re-emulsifying take place as in Example 2, whereby is obtained a storable, approximately 35% latex (VI) having pH 9.5 and 5% SiO₂.

A film of this latex painted onto for example wood or concrete gives a completely clear film without cracks or bubbles. Because of the low buffer capacity of the latex, the pH falls rapidly in the painting of wood from 9.5 to a neutral value. After mixing pigment into the latex (VI), this produces a colour layer having less tendency to stain and which is easier to clean compared to untreated latex.

What we claim is:

1. A process for producing an aqueous latex material used in the production of reinforced plastics and binders, comprising the steps of
   a. preparing an aqueous solution of monomeric and-/or oligomeric silicic acid by rapid neutralization and acidification of an alkali silicate solution to a final pH below 4 by adding silicate solution to a strong acid or to a suspension of a strong, acidified cationic ion exchanger,
   b. preparing an aqueous latex of a film-forming organic polymer, said latex (1) containing particles of a polymer which is film-forming at the temperatures used for drying the final product, (2) containing groups having hydrogen bonding power, and (3) being based on an emulsification system resistant to acidic conditions,
   c. adding the aqueous solution of the monomeric and/or oligomeric silicic acid prepared in (a) to the aqueous latex prepared in (b) while maintaining a pH below 6 thereby to effect an encapsulation of the silicic acid on the surface of the organic polymer particles and a reversible agglomeration of the encapsulated particles, the components prepared in (a) and (b) being mixed in such proportions that between 0.5 and 50% silicic acid will be encapsulated around the latex particles, calculated as SiO₂ based on the weight of the organic polymer, and
   d. adding alkali to the encapsulated and agglomerated latex up to a pH of 8 to 12 in aqueous phase, thereby to induce a negative ionic charge on the outer surface of the acidic silicic acid encapsulation layer and to cause re-emulsification.

2. A process according to claim 1, in which said pH in (a) is between 1.5 and 3.0.

3. A process according to claim 1, in which said pH in (c) is between 1.5 and 4.5.

4. A process according to claim 1, in which said percentage of silicic acid in (c) is between 2 and 15%.

5. A process according to claim 1, in which said pH in (d) is 9 to 11.

6. A process according to claim 1, comprising the steps of filtration, washing and concentration of the encapsulated and agglomerated latex product before said re-emulsification.

7. An aqueous latex material to be used in the production of reinforced plastics and binders comprising latex particles of an organic polymer, said latex (1) containing particles of a polymer which is film-forming at the temperatures used for drying the final product, (2) containing groups having hydrogen bonding power, and (3) being based on an emulsification system resistant to acidic conditions, said latex particles being encapsulated by between 0.5 and 50% of a layer of acidic, hydrated and hydrogen-bound silicic acid in monomeric and/or oligomeric form, calculated as SiO₂ based on the weight of the organic polymer, which layer is not penetrable by the organic polymer under wet conditions but will be penetrated upon drying under formation of a plastic structure, said structure being highly reinforced by a continuous but submicroscopically fine silicic acid structure, said latex having the property of delayed filmforming during drying.

8. An aqueous latex material according to claim 7, in which said percentage of silicic acid is between 2 and 15%.

* * * * *